Aug. 15, 1950  R. L. SEIDMAN  2,519,201
MACHINE FOR CUTTING STRIPS FROM CONTINUOUS MATERIAL, SUCH
AS WEBBING, RIBBON, OR THE LIKE
Filed June 7, 1949  2 Sheets-Sheet 1

INVENTOR
RICHARD L. SEIDMAN

Aug. 15, 1950 R. L. SEIDMAN 2,519,201
MACHINE FOR CUTTING STRIPS FROM CONTINUOUS MATERIAL, SUCH
AS WEBBING, RIBBON, OR THE LIKE
Filed June 7, 1949 2 Sheets-Sheet 2

INVENTOR
RICHARD L. SEIDMAN

Patented Aug. 15, 1950

2,519,201

UNITED STATES PATENT OFFICE 2,519,201

MACHINE FOR CUTTING STRIPS FROM CONTINUOUS MATERIAL, SUCH AS WEBBING, RIBBON, OR THE LIKE

Richard L. Seidman, Norwalk, Conn.

Application June 7, 1949, Serial No. 97,536

20 Claims. (Cl. 164—68)

My invention relates to cutting machines, and more particularly has reference to a machine for cutting strips from continuous material, especially material in the form of continuous webbing, ribbon, or the like.

An object of the invention is the provision of means for cutting strips from continuous material with a machine which has a rotatable knife member adapted to be actuated for severing the material in accordance with the thickness of the material advanced to the knife member by mechanism which comprises means for advancing the material lengthwise of itself to the knife member, a drive shaft adapted to be intermittently coupled to the knife member by clutch means which are actuated by a lever system in accordance with the thickness of the material fed to the knife member and which, in conjunction with gear means and a friction drive, effect the operation of the knife member for severing the material.

Other objects of the invention reside in the provision, in a machine of the character described, of clutch means comprising a driving member and a driven member, gear means comprising helical and spur gears which, in conjunction with a friction drive and said clutch means, intermittently effect the actuation of cutter means, a lever system for engaging the clutch means and cam means for disengaging it, stop means for arresting actuation of the cutter means, and gearing, other than said gear means and designed to permit the use of simple and readily adjustable cutter mechanism, adapted to operate said cutter means through said clutch, friction drive and gear means.

These and other objects of the invention will in part be obvious and will in part appear hereinafter.

The invention accordingly comprises the article possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
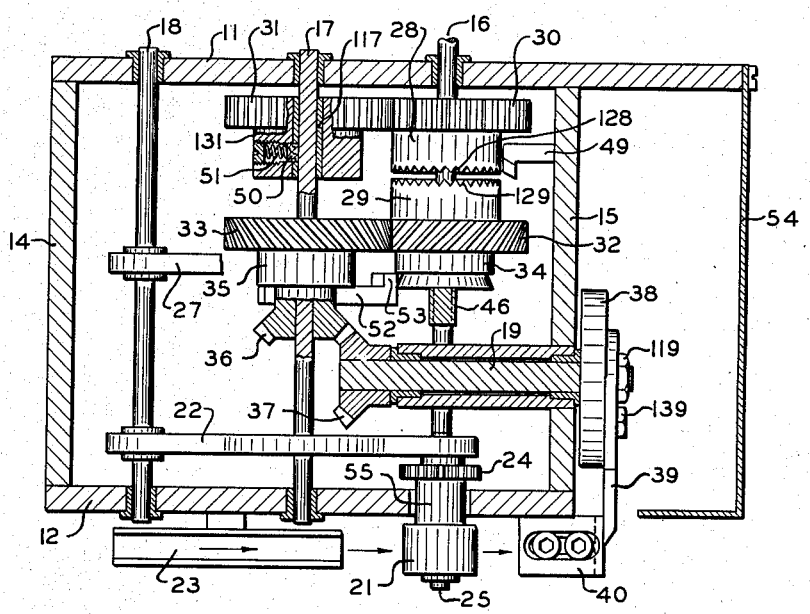
Figure 1 is a top plan view of my cutting machine with parts broken away and parts in section.
Figure 2:
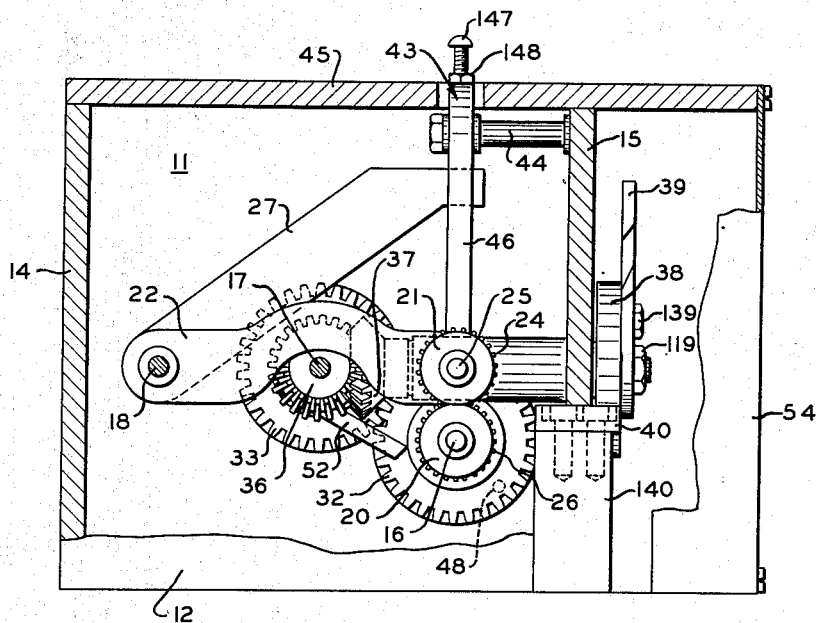
Fig. 2 is a side elevation of the machine with parts broken away and parts in section.

Certain industrial operations require that continuous material of the character having thick portions at spaced apart intervals, extending lengthwise of the material, be cut or severed transversely at predetermined locations.

For example, in making certain women's garments, such as slips, it is customary to form the shoulder straps of scrap material remaining from the cloth from which the panels of the slip are cut. This scrap is trimmed to width and cut into sections of from four to twenty-four inches in length. These sections are sewn together, end to end, to provide continuous material. Folding and double-edge machine sewing operations complete the continuous material which is in the form of a ribbon, or web, or the like, but which has thick portions where adjacent sections are overlapped in joining relation. Individual straps are formed by cutting the continuous material in back or in front of each thick portion, the thick portions or humps at the end of each strap being utilized to retain a buckle on the strap.

Strap-cutting operations of the character described serve admirably for the purpose of illustrating my invention and the same will be described in connection therewith.

To carry the objects and aims of the invention into effect I make use of a machine comprising a housing formed of side plates 11 and 12, end plates 14 and 15, and a top plate 45, which are suitably secured together by conventional means. The machine is supported on the bottom of the end and side plates on any suitable support surface. Shafts 16, 17 and 18 are mounted in parallel relation between the side plates 11 and 12, and a fourth shaft 19 is mounted on end plate 15. The axes of all shafts lie substantially in parallel planes and the axis of the shaft 19 is arranged at substantially 90° to the axes of the shafts 16, 17 and 18. The four shafts 16, 17 and 18 and 19 are mounted for rotation in conventional bushings or bearing supports in the manner disclosed in the drawings.

Shaft 16 constitutes a drive shaft which is adapted to be constantly rotated and is connected to a power source, not shown. Clutch means, friction drive means and gear means are associated with the drive shaft 16 and the shaft 17 for operatively connecting these two shafts together whereby the shaft 17 is rotated at predetermined intervals, as will hereinafter be set forth. Likewise, as will presently appear, the shaft 17, which is located intermediately of the shafts 16 and 18, is connected through special gearing to shaft 19. Shaft 19 provides a part of cutter mechanism employed with the machine and has a knife member fixed thereto for rotation therewith. Shaft 18 constitutes a rock shaft with which is associated a lever system for engaging the clutch means whereby to effect rotation of the knife member. The rock shaft 18 and the lever system also provide control means, dependent upon the thickness of the material advanced to the cutter means, for controlling the actuation of the clutch means.

The web-like material to be cut may be carried upon a suitable support, not shown, and is adapted to be fed from left to right of the machine, as shown in Fig. 1, through a guide 23 and between the peripheries of a feed roll 20 fixed to the drive shaft 16 and an idler roll 21 carried by a rock arm or lever member 22 which is fixed at one end to the rock shaft 18. Idler roll 21 is fixed to a sleeve 55 which is rotatably mounted on idler shaft 25 by conventional means. Idler shaft 25 is fixedly secured to arm 22. A gear 24 is also secured to the rotatable sleeve at a position adjacent the inner face of side plate 12 and this gear is adapted to cooperate with a similar gear 26 on the main drive shaft 16 whereby the idler roll 21 is positively driven on rotation of the drive shaft 16. This expedient avoids the possibilty of interruption of the advancement of the continuous material when a thick portion thereof reaches the feed roll and idler roll and assures that the two rolls cooperate with each other to force this thickened portion therebetween. Gravity constantly urges idler roll 21 towards feed roll 20 whereby there is pressure engagement of the material therebetween.

When the thick portion or hump in the material to be cut is fed between the idler roll 21 and the feed roll 20, the idler roll is elevated and this causes the arm 22 to rock the shaft 18. Side plate 12 is provided with a suitable opening therein to permit arcuate movement of the idler roll upon movement of arm 22. A second rock arm or lever member 27, fixed adjacent one end to the shaft 18, is consequently moved when the shaft 18 is rocked by the raising or lowering of arm 22 and the idler roll carried by it. Arm 27 is adapted to operate clutch means for actuating cutter mechanism in a manner to be presently described.

Clutch means employed with the machine comprise clutch members 28 and 29 mounted on the drive shaft 16. Clutch member 28 is fixed to the drive shaft and is constantly rotated therewith. Clutch member 29 is loosely mounted on the drive shaft and is slidable axially thereof. The opposed faces of clutch members 28 and 29 are provided, respectively, with suitable engaging members or teeth 128 and 129 which, upon engagement of the clutch by axial movement of the member 29 into contact with the clutch member 28, are adapted to be brought into mesh with each other whereby to cause clutch member 28 to drive clutch member 29.

When clutch member 29 is moved into contact with clutch member 28, the teeth on one of the clutch members should, preferably, be aligned with the spaces between the teeth on the other member to effect the immediate engagement thereof for driving the clutch member 29. If, when the clutch members are in contact, this alignment is lacking, there will be a slight rotative movement of the clutch member 28 relative to the clutch member 29 to bring the teeth into meshing position whereupon driving engagement of the clutch members occurs. Slippage of the clutch means, for the reasons just noted, will affect the relative position or proximity of the cut with respect to the leading edge or the trailing edge of a thick portion of the material being operated upon by the machine. Variation in the position of the cut relative to an edge of a thick portion may be reduced to a negligible factor by the employment of a fine tooth arrangement for the teeth 128 and 129. I have had considerable success using a tooth construction for the clutch members of about fifty teeth per inch of the diameter and with such arrangement variation in the relative location of the cut is retricted to a distance approximating the spacing between clutch teeth.

The gear means associated with the machine comprise a pair of spur gears 30 and 31 mounted, respectively, on shafts 16 and 17, and a pair of helical gears 32 and 33 also mounted, respectively, on shafts 16 and 17. Spur gear 30 is secured to the drive shaft 16 or to the fixed clutch member 28 and engages the spur gear 31 which is fixed to a suitable bushing 117 loosely mounted on the intermediate shaft 17 and consequently rotatable with respect thereto. The helical gear 32 is loosely mounted on the drive shaft 16 and is fixed to the movable clutch member 29 for axial movement therewith. Helical gear 32 engages the helical gear 33, which is secured to the shaft 17 for rotation therewith. Helical gear 32 is provided with a hub 34 while helical gear 33 is provided with a hub 35 which are used for a purpose to be presently set forth. As may be noted, one of the helical gears is left handed and the other is right handed.

Also, as may be observed, the spur gear 31 is provided with a hub 131. The friction drive means, heretofore mentioned, is mounted within this hub for engagement with shaft 17 whereby the spur gear 31 may be connected to this shaft.

A bevel gear 36, fixed on the shaft 17, is adapted to engage a similar bevel gear 37 fixed on the cutter shaft 19 for the purpose of rotating the cutter. It will be apparent from the foregoing that when the clutch members 28 and 29 are engaged, helical gear 32 will be rotated and will drive helical gear 33 on the shaft 17. Rotation of the shaft 17 will in turn drive the bevel gear 36 and cause rotation of the shaft 19 through the bevel gear 37 which is operatively engaged with the bevel gear 36.

The cutter mechanism comprises a disc fixed on the cutter shaft 19 and a knife member 39 fixed to the disc 38. The knife member 39 is adapted to cooperate with a stationary cutter member or blade 40 mounted on the upper surface of a block 140 which is secured to the side plate 12 by any conventional means. As may be observed, cutter member 40 is adjustably mounted on the block 140 in conventional manner for movement into the path of rotation of the knife member 39 and is adapted to be adjusted for slight rubbing contact with the knife member 39. The cutting surface of the cutter member 40 is a straight edge adapted to be positioned at right angles to the direction in which the material to be cut is advanced. The cutting surface of the knife member 39 is also straight edged and, similarly, is located at right angles to the flow of the material.

Cutter member 40 and block 140 together form a work support over which the moving material passes, the means for fastening the cutter member 40 to the work support being recessed in the cutter member or appropriately located in positions where they will not interfere with the flow of the material.

One practice for rigidly securing knife member 39 to the disc 38 provides an appropriate hole through the member adjacent one end thereof and mounts the knife member on shaft 19 which extends through the just-mentioned hole. Knife member 39 is retained on the shaft 19 by a nut 119 threaded on the end of the shaft. A second fastening means, comprising a bolt 138, adapted to extend through the disc 38 and through a slot 139 radially located in and extending through the knife member, permits the knife member 39 to be rigidly but adjustably secured to the disc 38. Knife member 39 is movable relative to disc 38 to suitably position it at the desired adjustment for cutting the continuous material at a location adjacent the leading edge or adjacent the trailing edge of the thick portions of the material.

Other arrangements may be used for connecting knife member 39 and disc 38 together. For example, a spring may be placed on shaft 19 between nut 119 and the knife member 39 to constantly urge the knife member into contact with the disc 38. Also, the adjustable mounting for the knife member 39 may be carried out through the use of a pin adapted to extend from the knife member 39 and to be engaged within one of a plurality of holes radially located and formed in the disc 38 in place of slot 139. When the knife member 39 is spring loaded, a function of the spring is to constantly urge the knife member 39 to a position where it will make contact with the stationary cutter 40 mounted on the side plate 12. In this instance the stationary cutter need not be adjustable but has only a portion of its cutting surface at a right angle to the flow direction of the material, and the remainder of said surface slightly inclined to the flow direction and away from the cutting surface of the knife member whereby the knife member 39 and stationary cutter have a cutting action similar to conventional scissors.

Figure 3:
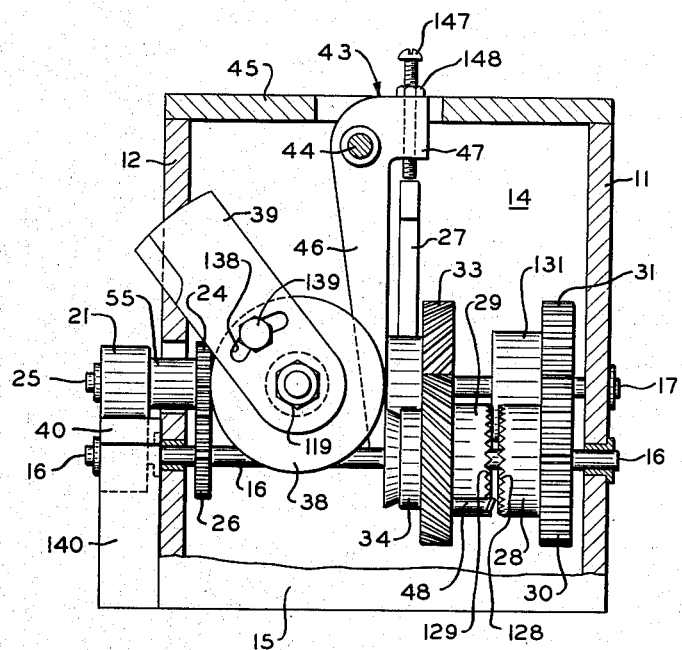
Fig. 3 is an end elevation of the machine with parts broken away and parts in section.
Figure 4:
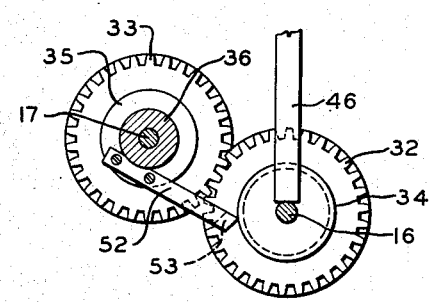
Fig. 4 is a detailed partial elevation showing stop mechanism employed with the machine.

As heretofore mentioned the rock arm 27, on the rock shaft 18, is employed to effect the engagement of the movable clutch member 29 with the fixed clutch member 28. To carry out this practice, use is made of a bell crank 43 which is pivoted on a stud 44 fixed to the end plate 15. The upper end of the bell crank, i. e. the portion above the pivot 44, extends through an opening provided in the top plate 45. Bell crank 43 has a long arm 46 which depends downwardly from the pivot towards the drive shaft 16, and a short arm 47 which extends generally at a right angle to arm 46. The pivot stud 44 is so positioned, and the bell crank 43 is so mounted thereon, that normally an edge of the long arm 46 is substantially parallel to the face of the hub 34 of the helical gear 32, as shown in Fig. 3. When the bell crank is rocked the long arm 46 is adapted to bear against the face of the hub 34 and continued movement of the bell crank moves the helical gear 32 and the clutch member 29 towards the driving clutch member 28 and effects engagement of the clutch whereby to cause rotation of the helical gear 32 which drives the helical gear 33.

Movement of the bell crank is effected by the rock arm 27 which is fixed to the shaft 18. The upper end of the rock arm 27 is adapted to contact a screw 147 which extends through the short arm 47 of the bell crank when the bell crank is in its normal or inoperative position. Screw 147 permits adjustment of the lever system for different thicknesses of material and is secured in adjusted position by a cooperating lock nut 148. Thus, it will be apparent that when the lever or rock arm 22 is elevated, due to a hump in the material passing between the idler and feed rolls, the rock arm 27 will also be elevated and will cause the bell crank 43 to swing in a counter-clockwise direction, as viewed in Fig. 3, whereby to engage the clutch and cause rotation of the shaft 17 and consequent actuation of knife member 39.

It is necessary that rotation of the knife member be carried out in proper timed relation. When a thick portion of the material passes between the feed and the idler rolls, and causes engagement of the clutch, a certain length of material must travel out to the knife members 39 and 40 before the cut takes place. Consequently, the knife member 39 must always begin the cutting cycle from the same starting position so that it meets the material at the proper distance behind or ahead of the thick portion. To carry out this proper timing it has been found desirable to disengage the clutch members 28 and 29 before the knife member 39 has completed a revolution and to continue the drive of the shafts 17 and 19 and the knife member 39 by the utilization of the friction drive means heretofore mentioned. The movable clutch member 29 remains engaged with the fixed clutch member 28 until the cut has been made, after which the movable member is disengaged and the friction drive means causes continued rotation of the knife member 39 until it reaches its starting position.

Disengagement of the clutch is effected by cam means which comprise a small shouldered rod forming a cam 48 having one end fixed to the face of the helical gear 32 next adjacent the clutch member 29, and having the other end adapted to cooperate with a similar cam 49 fixed to the side plate 11 or to the end plate 15. Cams 48 and 49 are appropriately inclined with respect to each other, in the manner illustrated, whereby, when the movable cam member 48 comes in contact with the fixed cam member 49, the clutch member 29 is moved out of engagement with the clutch member 28. As previously pointed out, it is to be noted that the clutch is disengaged before the cutter has completed one revolution.

Continuation of rotation of the knife member 39, after disengagement of clutch members 28 and 29, is effected through the previously referred to friction drive means. These means make use of a suitable radial hole in the hub 131 of the spur gear 31. A leather plunger 50, slidable in this hole, is constantly urged into engagement with the shaft 17 by means of a spring 51 mounted within the hole and retained therein by a suitable plug. The friction drive means just described is sufficient to continue rotation of the shaft through the described gearing after the movable clutch member has been disengaged from the fixed clutch member. Consequently, the cutter means will still be driven unless rotation of the shaft 17 is arrested.

Means for stopping the cutter means comprises an arm 52 fixed to the hub 35 of the helical gear 33 so that it is rotatable with this gear. Arm 52, at the end thereof most distant from hub 35 of the helical gear 33, has an angular finger 53 which is adapted to rest on hub 34 of the helical gear 32 when the clutch member is in its disengaged position. When, however, the clutch member 29 is moved axially into engaging position with the clutch member 28, finger 53 of arm 52 is free of contact with hub 34 of helical gear 32. Thus, when helical gear 32 is rotated to drive helical gear 33 the arm 52 will also be rotated with helical gear 33 and its hub 35. As previously pointed out, clutch member 29 is disengaged before the knife member has made a complete revolution and the cutter drive means is still actuated by means of the friction clutch mechanism heretofore described. However, when arm 52 has made one complete revolution, the hub 34 will be in its path and will engage the hub. This engagement will consequently break the friction drive and stop operation of the knife member 39 at the desired location. Thus, while spur gear 31 is constantly rotated it will be in slipping engagement with shaft 17 during the advancement of the material between cutting cycles.

As may be noted, a slight taper is provided on the hub upon which the finger 53 of stop arm 52 is adapted to rest when the clutch means is in disengaged position. This taper is to prevent the movable clutch member from walking towards the fixed clutch member and causing the two clutch members to be accidentally engaged.

Because of the low inertia of the intermittent drive system for the knife member 39, the movable clutch member 29 and the knife member 39 will come to rest before rotatable cam member 48, associated with this clutch member, has cleared fixed cam member 49 when the cam means operate to disengage the clutch means unless provision is made to overcome this condition. If the movable clutch member 29 were allowed to remain in this uncleared position it could not be re-engaged with clutch member 28 due to interference between cams 48 and 49. The use of helical gears 32 and 33 removes this difficulty.

While movable clutch member 29 is engaged with clutch member 28, the helical gear 32, attached to the clutch member 29, is a driver for the shaft 17 and the force component set up thereby tends to engage the clutch means. On the other hand, when the clutch means are disengaged the just-mentioned helical gear 32 becomes a follower due to the friction drive on shaft 17. When this takes place the force component reverses itself and tends to push the movable clutch member 29 away from cam 49 whereby to move cam 48 into cleared relation with cam 49 by allowing the clutch member 29 to rotate freely until the stop arm 52 comes into action.

For purposes of safety the side plate 11 is extended beyond the end plate 15 whereby a suitable shield 54, in the form of a thin plate, may be placed around the knife member in the manner shown in the drawings.

The complete operation of the machine is believed apparent from the foregoing. Continuous material is led from a suitable source of supply, carried on a rotatably mounted spool or the like, through the guide tube 23 and between the feed roll 20 and idler roll 21 which causes the material to be constantly advanced lengthwise of itself in the direction shown by the arrows in Fig. 1. When a thick portion of the material is engaged between the feed and idler rolls, the shaft 18 is rocked, causing the rock arm 27 to actuate the bell crank and engage the movable clutch member 29 with the fixed clutch member 28. This causes rotation of the shaft 19 and actuation of the knife member 39. During this time the material is advanced from the feed and idler rolls towards and over the closely located stationary cutter or blade 40 which together with block 140 also functions as a work support. When the thick portion of the material which operated the lever system to engage the clutch mechanism has been advanced to a position at that edge of the stationary cutting surface, the knife member 39 will have rotated into position to sever the material at the desired position with respect to the thick portion.

Shortly after a cut has been made the cam means 48 and 49 come into action and disengage the clutch means. In this regard it is to be particularly noted that driving of the shaft 17 through the clutch means is only momentary and for less than a complete revolution. After the cutting operation, and until the starting position for the cutting cycle has been reached, the knife member 39 is driven through the friction drive means. When the starting position is reached the stop arm 52, which has been freed from contact with the hub 34 of the helical gear 32, is again brought into contact with this hub whereby to break the friction drive for the cutter means and to arrest movement of the knife member 39. This completes a cutting operation which is continued at predetermined intervals as long as material is fed to the machine.

By driving the rotatable knife member 39 through bevel gears which rotate the knife member about an axis perpedicular to the main drive shaft 17, I am enabled to provide cutting mechanism which is located at a readily accessible position and which is designed for simplified adjustment.

In the construction shown, the knife member 39 need be adjusted in only one direction and for one purpose only, namely, to cause the cut to occur at the leading edge or at the trailing edge of the thick portions of the material operated upon. This adjustment is effected while the knife member 39 is at rest position between cycles by loosening the means securing the knife member 39 to disc 38, moving the knife member relative to the disc 38 to its desired setting, and then tightening the means securing the knife member to the disc. With the knife member 39 at rest position between cycles, adjustment position for cutting the material at the leading edge of a thick portion is towards the end of slot 139 closest to the path in which the material is moved, while the adjustment position for cutting at the trailing edge of a thick portion is in the opposite direction.

Similarly, adjustment of the stationary cutter member 40 is in one direction and for one purpose only, namely, to a position for rubbing contact with the rotary knife member 39. Following this adjustment, it is only necessary to securely fasten cutter member 40 in this desired position.

Only one other operating adjustment, if required, need be made. This adjustment involves positioning of the screw 147 to accommodate the machine to the maximum thickness of the material being cut.

It will be appreciated that the adjustments just described are so simple that they can be carried out by unskilled operators. Furthermore, the construction employed places the loci for adjustments at easily accessible positions outside of the housing of the machine where likelihood of accidental injury is materially reduced.

With the machine of my invention, I have successfully cut continuous material of the character described at the rate of about eighty feet per minute, making cuts at intervals of from about sixteen inches up to fifty-one inches. A higher rate of speed is attainable if desired and also cuts at considerably smaller intervals are possible. The accuracy of the position of the cuts is attainable by the use of fine teeth on the clutch members 28 and 29, as previously described, and also by reason of the positive stop means employed for arresting the knife member at its position to start a cutting cycle, as well as by providing rolls 20 and 21 with surfaces having a relatively high coefficient of friction, such as knurled or corrugated metal surfaces or soft rubber surfaces whereby slippage between the continuous material and the rolls is substantially avoided.

Since certain changes may be made in the above article without departing from the scope of the invention herein involved, it is intended that all matter contained in the above description, or shown in the accompanying drawings, shall be interpreted as illustrative and not in a limiting sense.

What I claim is:

1. A machine for cutting strips from continuous ribbon, webbing or the like, comprising a drive shaft adapted to be constantly rotated, rotatable feed means driven by said shaft and engaging said material therebetween for advancing the material lengthwise of itself, rotatable cutter means comprising a rotatable knife member for severing said material advanced by said feed means, gear means for connecting said drive shaft and said cutter means in positive driving relation for rotating said cutter means, movable clutch means rotatable with said shaft and positionable for engaging said drive shaft with said gear means in said positive driving relation, a system of levers actuated by said feed means in accordance with the thickness of the material engaged by said feed means for positioning said clutch means in operative engagement, cam means for disengaging said clutch means from said positive driving relation, friction drive means for effecting a slippage drive connection between said drive shaft and said cutter means through said gear means and for effecting intermittent rotation of said cutter means on disengagement of said clutch means from said positive driving relation by said cam means, and stop means normally holding said friction drive means stationary but releasable on said engagement of said clutch means and returnable to holding position following disengagement of said clutch means by said cam means whereby to arrest rotation of said cutter means.

2. A machine as set forth in claim 1 for cutting strips from continuous ribbon, webbing or the like, wherein said stop means arrests rotation of said cutter means after said knife member has made substantially a complete revolution.

3. A machine as set forth in claim 1 for cutting strips from continuous ribbon, webbing or the like, wherein said gear means comprises a plurality of gears and said stop means comprises an arm fixed at one end for rotation with one of said gears and having its other end engageable in bearing contact with a projecting portion provided on a second gear.

4. A machine as set forth in claim 1 for cutting strips from continuous ribbon, webbing or the like, wherein said cutter means comprises a rotatable knife member mounted for rotation about an axis substantially parallel to the direction of advancement of the material to be cut.

5. A machine as set forth in claim 1 for cutting strips from continuous ribbon, webbing or the like, wherein said cutter means comprises a fixed cutter member over which the material to be cut is advanced, and a knife member mounted for rotation about an axis substantially parallel to the direction of advancement of said material, said cutter member being located in the path of rotation of said knife member for rubbing contact therewith on rotation of said knife member.

6. A machine of the character set forth in claim 1 wherein said clutch means comprises a clutch member fixed to said drive shaft and a clutch member loosely mounted on said drive shaft and slidable axially thereof, the adjacent faces of said clutch members being provided with teeth which cooperatively engage each other upon relative movement of said clutch members into contact whereby said movable clutch member is rotated during said contacting engagement.

7. A machine of the character set forth in claim 1 wherein said clutch means comprises a clutch member fixed to said drive shaft and a clutch member loosely mounted on said drive shaft and slidable axially thereof, the adjacent faces of said clutch members being provided with teeth which cooperatively engage each other upon relative movement of said clutch members into contact whereby said movable clutch member is rotated during said contacting engagement, and wherein said positive drive connection between said drive shaft and said cutter means is effected by a gear of said gear means which is loosely mounted on said drive shaft and fixed to said movable clutch member for rotation and axial movement therewith.

8. A machine of the character set forth in claim 1 wherein said cam means comprises a pair of cam members, one of which is fixed to said machine and the second of which, when said clutch means is in operative engagement, is rotatable with the clutch means into contact with said first cam member to break said operative engagement of said clutch means.

9. In a machine of the character set forth in claim 1 and wherein said gear means comprise a plurality of gears, clutch means comprising a clutch member fixed to said drive shaft and a clutch member loosely mounted on said drive shaft and slidable axially thereof, the adjacent faces of said clutch members being provided with teeth which cooperatively engage each other upon relative movement of said clutch members into contact whereby said movable clutch member is rotated during said contacting engagement, a gear of said gear means loosely mounted on said drive shaft and fixed to said movable clutch member for rotation and axial movement therewith, a cam member rotatable with said gear and fixed to and extending from the face of said gear nearest said movable clutch member, a stationary cam member, said stationary cam member being secured to said machine and located for contact with said first cam member when said clutch members are engaged and are rotated through less than one revolution, the contacting surfaces of said cam members being shaped to exert a force on said movable clutch member which moves it out of engagement with said fixed clutch member when said cam members are brought into contact with each other.

10. A cutting machine of the character defined in claim 1 wherein said feed means comprises a feed roll fixed on said drive shaft and an idler roll which together engage the material to be cut in pressure contact and advance the material upon rotation of said rolls, means mounting said idler roll for rotation about an axis substantially parallel to said drive shaft and for movement towards and away from said feed roll in accordance with the thickness of the material engaged between said rolls, gear means on said drive shaft and associated with said idler roll for connecting said drive shaft in positive drive relation with said idler roll, said mounting means for said idler roll controlling the actuation of said lever system for engaging said clutch means.

11. A cutting machine of the character defined in claim 1 wherein said lever system comprises a rock shaft which is rocked in accordance with the thickness of the material engaged for advancement by said feed means, a rock arm having a free end and an end fixed to said rock shaft, and a bell crank movable about a pivot spaced from said rock shaft, the free end of said rock arm operatively contacting and rotating said bell crank about its pivot upon engagement of a thick portion of said material by said feed means and the other arm of said bell crank operatively contacting said clutch means and moving the clutch means into engaging position upon movement of said rock arm caused by engagement of said thick portion of said material by said feed means, said bell crank being mounted so as to return to inoperative position upon movement of the rock shaft and said rock arm resulting from a thin portion of said material being engaged by said feed means.

12. A machine for cutting strips from continuous ribbon, webbing or the like, comprising a pair of rotatably mounted shafts arranged in parallel relation to each other, one of said shafts providing a drive shaft adapted to be constantly rotated and the second of said shafts being driven from said drive shaft, rotatable feed means driven by said drive shaft and engaging said material therebetween for advancing the material lengthwise of itself, a rotatably mounted cutter shaft operatively driven from said second shaft, a knife member fixed to said cutter shaft for severing said material advanced by said feed means, gear means on said parallel shafts connecting said drive shaft and said second shaft in positive driving relation for rotating said cutter shaft and the knife member fixed thereto, clutch means mounted on said drive shaft, said clutch means being rotatable with said drive shaft and positionable for engaging the gear means on said drive shaft and said second shaft in said driving relation, a system of levers actuated by said feed means in accordance with the thickness of the material engaged by said feed means for positioning said clutch means in operative engagement, cam means for disengaging said clutch from said positive driving relation, friction drive means for effecting a slippage drive connection between said drive shaft and said second shaft through said gear means and for effecting intermittent rotation of said knife member on disengagement of said clutch means from said positive driving relation by said cam means, and stop means normally holding said friction drive means stationary but releasable on said engagement of said clutch means and returnable to holding position following disengagement of said clutch means by said cam means whereby to arrest rotation of said cutter shaft and the knife member thereon.

13. A machine as defined in claim 12 for cutting strips from continuous ribbon, webbing or the like, wherein said gear means comprise a spur gear and a helical gear mounted on said drive shaft and a spur gear and a helical gear mounted on said second shaft, said spur gears being in operative engagement with each other and said helical gears being in operative engagement with each other.

14. A machine as defined in claim 12 for cutting strips from continuous ribbon, webbing or the like, wherein said gear means comprise a spur gear and a helical gear mounted on said drive shaft and a spur gear and a helical gear mounted on said second shaft, said spur gears being in operative engagement with each other and said helical gears being in operative engagement with each other, and wherein the spur gear and the helical gear associated with said drive shaft are respectively fixedly and loosely mounted thereon.

15. A machine as defined in claim 12 for cutting strips from continuous ribbon, webbing or the like, wherein said clutch means comprises a clutch member mounted on and fixed to said drive shaft for rotation therewith and a clutch member loosely mounted on and slidable axially of said drive shaft for movement into engagement with the first-mentioned clutch member whereby to effect rotation of said second clutch member, and wherein a spur gear on the drive shaft is secured to said shaft for rotation with said fixed clutch member and a helical gear is loosely mounted on said drive shaft and fixed to said movable clutch member for rotation and axial movement therewith.

16. A machine as defined in claim 12 for cutting strips from continuous ribbon, webbing or the like, wherein said gear means comprise a spur gear and a helical gear mounted on said drive shaft and a spur gear and a helical gear mounted on said second shaft, said spur gears being in operative engagement with each other and said helical gears being in operative engagement with each other, wherein the spur gear and the helical gear associated with said drive shaft are, respectively, fixedly and loosely mounted thereon, and wherein the helical gear on the drive shaft is loosely mounted thereon and axially slidable thereof while the helical gear on the second shaft is mounted on the second shaft for rotation therewith and the spur gear on the drive shaft is fixed thereto for rotation therewith while the spur gear on the second shaft is loosely mounted thereon and frictionally engaged therewith in said slippage drive connection.

17. A machine of the character set forth in claim 12 wherein said gear means comprise a helical gear loosely mounted on said drive shaft and axially slidable thereof but rotatable therewith upon positioning of said clutch means for effecting said driving relation between said shafts, a helical gear engaged with said first-mentioned helical gear and fixedly mounted on said second shaft, and a stop arm fixed at one end to said second helical gear for rotation therewith, the other end of said arm being engageable with a projecting portion on said first helical gear when said clutch means is in disengaged position and being free of said projection portion for rotation with said second helical gear when said clutch means is in engaged position.

18. A machine of the character set forth in claim 12 having clutch means comprising a clutch member fixedly mounted on said drive shaft for rotation therewith and a second clutch member loosely mounted on said drive shaft and axially slidable thereof for engagement with said first clutch member, a gear loose on said drive shaft and slidable axially thereof, said gear being fixed to said second clutch member for axial movement therewith, a gear mounted on said second shaft for rotation therewith, said gears being constantly engaged with each other, and cam means for disengaging said clutch members comprising a cam member fixed to and rotatable with said first-mentioned gear and a cam member fixed to said machine, said first-mentioned cam member being brought into contact with said second cam member on rotation of said first gear and moving said first gear and said slidable clutch member away from the fixed clutch member.

19. A machine of the character set forth in claim 12 wherein a bevel gear fixed on said second shaft and a second bevel gear fixed on said cutter shaft are in operative engagement with each other for operatively connecting said cutter shaft through said gear means to said drive shaft.

20. A cutting machine as defined in claim 12 having a rock shaft rotatably mounted in substantially parallel relation to said drive shaft and said second shaft and being rockable in accordance with the thickness of the material engaged for advancement by said feed means, a bell crank pivoted for movement into operative contact with said clutch means for moving said clutch means into engaging position, and a rock arm fixed to and rocked by said rock shaft and operatively contacting said bell crank for effecting movement of the bell crank to move said clutch means.

RICHARD L. SEIDMAN.

No references cited.